(12) United States Patent
Ryan et al.

(10) Patent No.: US 12,741,304 B2
(45) Date of Patent: Sep. 22, 2026

(54) SUB-AMBIENT TEMPERATURE TRANSFER SYSTEM FOR COLD FORMING PROCESSES

(71) Applicant: GM GLOBAL TECHNOLOGY OPERATIONS LLC, Detroit, MI (US)

(72) Inventors: Daniel Ryan, Fenton, MI (US); Whitney Ann Poling, Rochester Hills, MI (US); Diptak Bhattacharya, Royal Oak, MI (US); Andrew Clay Bobel, Troy, MI (US); Nicole Ellison, Southfield, MI (US); Ratandeep Singh Kukreja, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 283 days.

(21) Appl. No.: 18/594,757

(22) Filed: Mar. 4, 2024

(65) Prior Publication Data

US 2025/0276353 A1 Sep. 4, 2025

(51) Int. Cl.
*B21B 1/40* (2006.01)
*B21B 45/02* (2006.01)
*H01M 4/04* (2006.01)

(52) U.S. Cl.
CPC ............ *B21B 1/40* (2013.01); *B21B 45/0209* (2013.01); *H01M 4/0435* (2013.01)

(58) Field of Classification Search
CPC ............ B21B 45/0209; B21B 45/0206; B21B 45/0203; B21B 45/02; B21B 1/40; B21B 13/145; B21B 27/08; B21B 2027/083; B21B 37/74; B21B 43/00; H01M 4/0435
See application file for complete search history.

(56) References Cited

U.S. PATENT DOCUMENTS 4,242,781 A * 1/1981 Takigawa ................ B21B 27/05 492/5
5,567,448 A 10/1996 Frankland
5,642,772 A * 7/1997 Charpentier ............ B21B 27/08 164/443
5,651,410 A * 7/1997 Perry ...................... B21B 27/08 164/428
6,533,023 B2 3/2003 Fukase et al.
10,773,298 B2 9/2020 Hohenbichler
2002/0038696 A1 4/2002 Fukase et al.
(Continued)

FOREIGN PATENT DOCUMENTS

CN 219817473 U 10/2023
DE 102016222004 A1 5/2018
JP 2015157294 A 9/2015

OTHER PUBLICATIONS

German Office Action from counterpart DE1020241119098, dated Apr. 17, 2025.
(Continued)

*Primary Examiner* — Teresa M Ekiert

(57) ABSTRACT

A system configured to roll a metal into a foil. The system includes work rollers spaced apart to accommodate the metal therebetween. The work rollers are configured to press against the metal to roll the metal into the foil. A cooling subsystem is spaced apart from the work rollers on a work line configured to feed the metal to the work rollers. The cooling subsystem is configured to cool the metal as the metal moves along the work line.

18 Claims, 6 Drawing Sheets

(56) References Cited

U.S. PATENT DOCUMENTS

| | | | | |
|---|---|---|---|---|
| 2005/0150631 | A1* | 7/2005 | Bergmans | B22D 11/1287 164/448 |
| 2010/0175452 | A1* | 7/2010 | Ohlert | C21D 9/48 72/200 |
| 2011/0162427 | A1* | 7/2011 | Nakata | B21B 45/0233 72/201 |
| 2021/0060638 | A1 | 3/2021 | Herle | |

OTHER PUBLICATIONS

German Office Action from counterpart DE1020241096624, dated Mar. 18, 2025.

* cited by examiner 210
112
220
222
120

220
222
220
222

240
244
220B
242
240
244
242
220B 260
264
220D
262

220A
230
232
234
220A
230
232
234

250
220C
252
254
250
220C
252
254

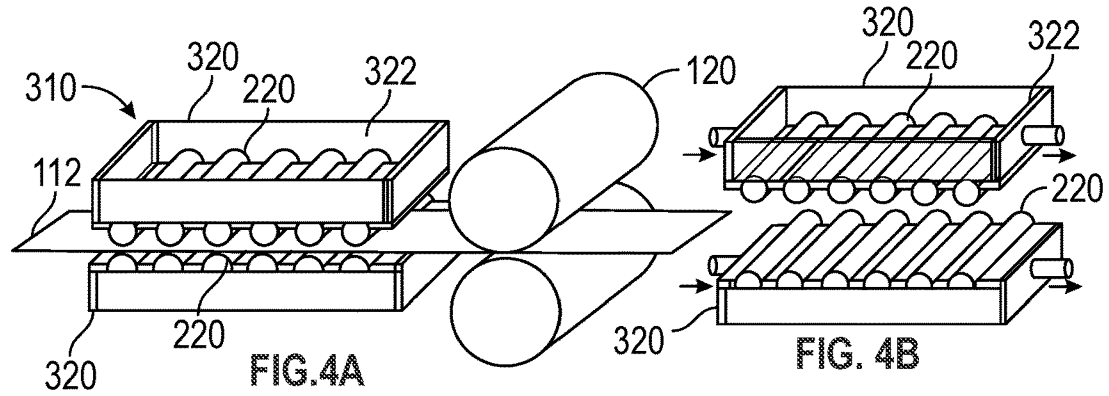
FIG.4A
FIG. 4B
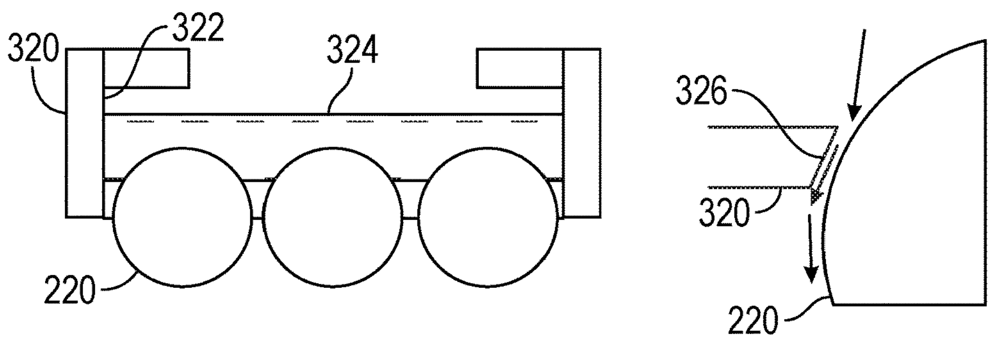
FIG.4C
FIG.4D
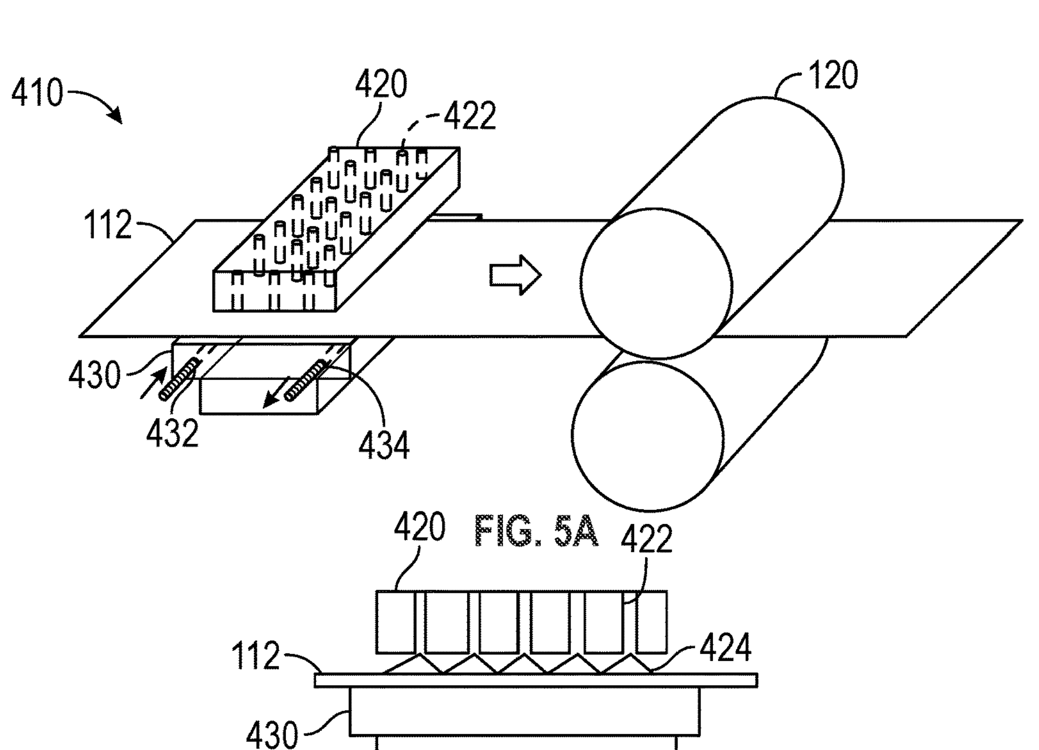
FIG. 5A
FIG. 5B

SUB-AMBIENT TEMPERATURE TRANSFER SYSTEM FOR COLD FORMING PROCESSES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to sub-ambient temperature transfer systems for cold forming processes configured to roll metals into foils, the metals having relatively low melting temperatures.

Various manufacturing processes include rolling metals into foils. For example, lithium may be rolled into a thin foil to form an active layer of a battery anode. The lithium foil may be applied to any suitable current collector, such as a copper foil, to form the anode. Indium, tin, lead, and sodium are additional examples of metals that may be rolled into foils. In some cases, the metals may have a relatively low melting temperature.

SUMMARY

The present disclosure includes, in various features, a system configured to roll a metal into a foil. The system includes work rollers spaced apart to accommodate the metal therebetween. The work rollers are configured to press against the metal to roll the metal into the foil. A cooling subsystem is spaced apart from the work rollers on a work line configured to feed the metal to the work rollers. The cooling subsystem is configured to cool the metal as the metal moves along the work line.

In further features, the metal includes at least one of lithium, indium, tin, lead, and sodium.

In further features, the foil is configured as an active layer of a battery electrode.

In further features, the cooling subsystem includes cooling rollers defining channels therein configured to receive coolant to cool the cooling rollers and cool the foil in contact with the cooling rollers.

In further features, the channels extend entirely through the cooling rollers parallel to an axis of rotation of the cooling rollers.

In further features, the channels extend non-linearly relative to an axis of rotation of the rollers.

In further features, the channels include an inlet and an outlet at a common side of the cooling rollers.

In further features, the present disclosure includes polymeric support members between adjacent ones of the cooling rollers.

In further features, the cooling subsystem includes a housing adjacent to the cooling rollers, the housing defining a receptacle configured such that outer surfaces of the cooling rollers are accessible from within the housing and coolant present within the receptacle contacts the outer surfaces of the rollers. Gaps are defined between the housing and each one of the cooling rollers providing a rotational clearance for the cooling rollers and providing controlled release of the coolant from the receptacle onto the cooling rollers to cool and lubricate the cooling rollers.

In further features, adjacent rollers of the cooling rollers are offset from one another.

In further features, the cooling subsystem includes an upper guide and a lower guide opposite to the upper guide, the upper guide and the lower guide are spaced apart to accommodate the metal therebetween; the upper guide defines perforations configured to direct chilled air through the upper guide to the metal to cool the metal with an air blanket; and the lower guide is made of a thermally-conductive material and defines a cooling channel configured to circulate coolant through the lower guide to cool the metal, the air blanket pushes the metal against the lower guide.

In further features, the cooling subsystem includes an upper guide and a lower guide opposite to the upper guide, the upper guide and the lower guide are spaced apart to accommodate the metal therebetween; the upper guide includes a guide roller made of an insulating material, the guide roller is configured to press the metal against the lower guide; and the lower guide is made of a thermally-conductive material and defines a cooling channel configured to circulate coolant through the lower guide to cool the metal, the guide roller is configured to push the metal against the lower guide.

In further features, the cooling subsystem includes an upper guide and a lower guide opposite to the upper guide, the upper guide and the lower guide are spaced apart to accommodate the metal therebetween; the upper guide defines perforations configured to direct chilled air through the upper guide to the metal to cool the metal with an air blanket; and the lower guide includes a heat pump configured to cool the metal, the air blanket pushes the metal against the lower guide.

In further features, the cooling subsystem includes an upper guide and a lower guide opposite to the upper guide, the upper guide and the lower guide are spaced apart to accommodate the metal therebetween; the upper guide includes a guide roller made of an insulating material, the guide roller is configured to press the metal against the lower guide; and the lower guide includes a Peltier stage configured to cool the metal, the guide roller is configured to push the metal against the lower guide.

In further features, the cooling subsystem includes a load guide defining a primary channel therethrough with the work line extending through the primary channel, a plurality of upper channels are above the primary channel, and a plurality of lower channels are below the primary channel; and the upper channels and the lower channels are configured to direct a coolant to the metal.

The present disclosure also includes, in various features, a system configured to roll a metal into a foil. The system includes: work rollers spaced apart to accommodate the metal therebetween, the work rollers configured to press against the metal to roll the metal into the foil; and a cooling subsystem spaced apart from the work rollers on a work line configured to feed the metal to the work rollers, the cooling subsystem including an upper guide and a lower guide on opposite sides of the work line, at least one of the upper guide and the lower guide is configured to be cooled with a coolant to cool the metal as the metal moves through the cooling subsystem.

In further features, at least one of the upper guide and the lower guide includes cooling rollers defining cooling channels configured for circulating the coolant through the cooling rollers.

In further features, one of the upper guide and the lower guide is configured to push the metal against the other of the upper guide and the lower guide.

The present disclosure further provides for a system configured to roll a metal into a foil. The system includes work rollers spaced apart to accommodate the metal therebetween, the work rollers configured to press against the metal to roll the metal into the foil; and a cooling subsystem spaced apart from the work rollers on a work line configured to feed the metal to the work rollers, the cooling subsystem including an upper guide and a lower guide on opposite sides of the work line, at least one of the upper guide and the lower guide is configured to cool the metal as the metal moves through the cooling subsystem. The metal includes at least one of lithium, indium, tin, lead, and sodium, and the foil is configured as an active layer of a battery electrode.

In further features, at least one of the upper guide and the lower guide includes a heat pump configured to cool the metal.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4A is a perspective view of an additional cooling subsystem in accordance with the present disclosure;

FIG. 4B is a perspective view of an upper housing and a lower housing of the cooling subsystem of FIG. 4A, the housings in cooperation with cooling rollers;

FIG. 4C is a cross-sectional view of the upper housing and cooling rollers of FIG. 4B, the upper housing filled with a coolant;

FIG. 4D illustrates a clearance gap between the upper housing and one of the cooling rollers;

FIG. 5A is a perspective view of another cooling subsystem in accordance with the present disclosure;

FIG. 5B is a side view of an upper cooling guide and a lower cooling guide of the guide system of FIG. 5A;

In the drawings, reference numbers may be reused to identify similar and/or identical elements.

DETAILED DESCRIPTION

The present disclosure includes a system configured to roll a metal into a foil. The metal may be any suitable metal having a relatively low melting temperature, such as one or more of lithium, indium, tin, lead, sodium, etc. The foil may be configured for use in any suitable automotive or non-automotive application. For example, the foil may be used as an active layer of a battery electrode. The battery may be configured for use with a vehicle, and may be configured for non-vehicular use as well.

Lithium, indium, tin, lead, sodium, and other metals with relatively low meting temperatures lack mechanical strength at room temperature, which presents challenges with rolling such metals into foils. For example, such metals are prone to tearing and fracturing during rolling, and may stick to the work rollers. The present disclosure includes a cooling subsystem configured to reduce the temperature of the metals prior to reaching work rollers and/or between sets of work rollers. The system of the present disclosure provides for rolling of the metals at sub-ambient temperatures in a dry room environment with a dew point below the rolling temperature of the metals. Reducing the temperature of metals with relatively low melting temperatures provides the metals with increased strength and hardness, which allows the metals to be rolled to thinner foil gauges. The present disclosure chills the metal in various ways prior to reaching the work rollers, as described in detail herein.

Figure 1:
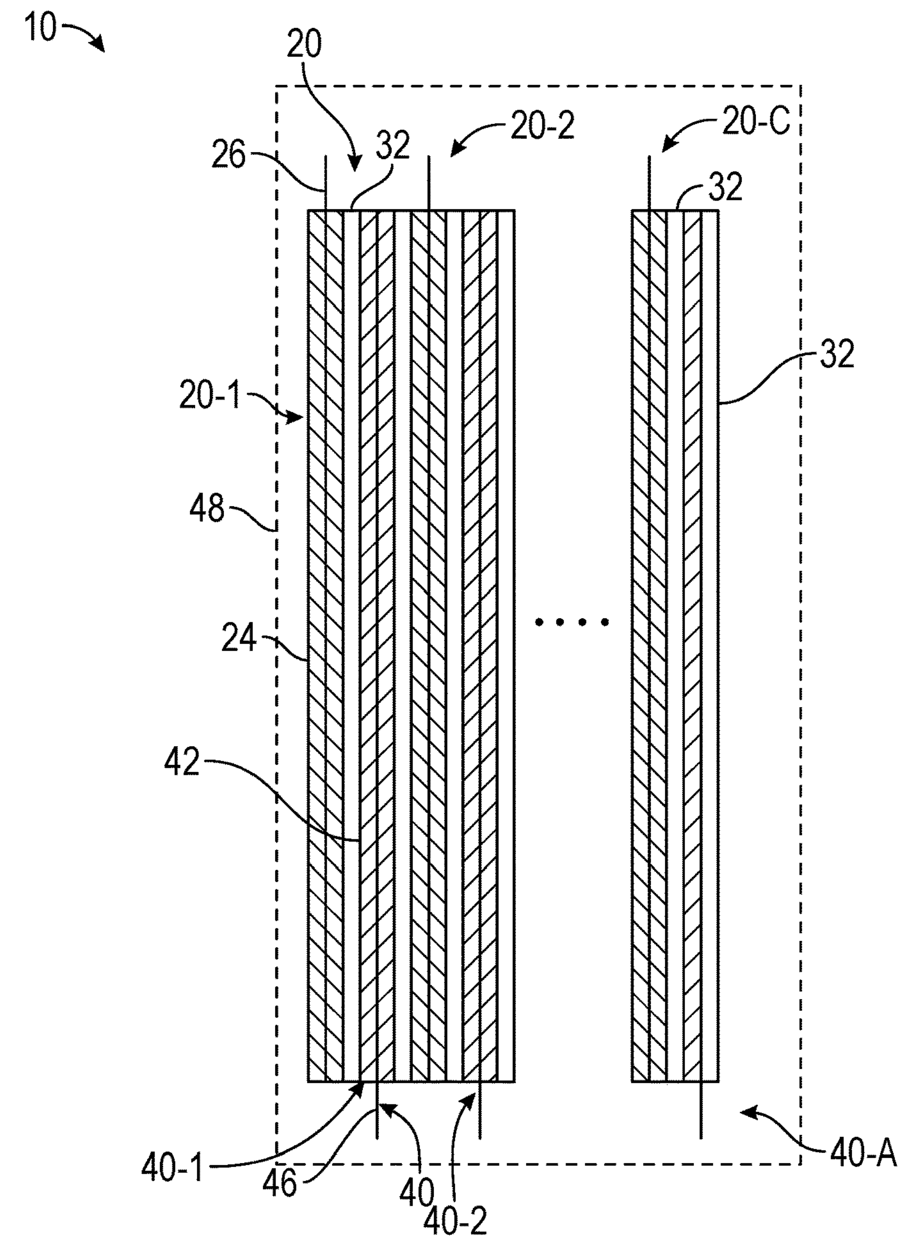
FIG. 1 is a cross-sectional view of an exemplary battery cell including current collectors coated with active layers.

FIG. 1 illustrates an exemplary battery cell 10. The battery cell 10 may be configured for use in any suitable application, such as any suitable automotive or non-automotive application. The battery cell 10 includes C cathode electrodes 20, A anode electrodes 40, and S separators 32 arranged in a predetermined sequence in a stack 12, which is seated in an enclosure 48. C, A, and S are integers, which are each greater than one. In some examples, A=C+1. The C cathode electrodes 20-1, 20-2, . . . , and 20-C include cathode active layers 24 arranged on one or both sides of cathode current collectors 26. The A anode electrodes 40-1, 40-2, . . . , and 40-A include anode active layers 42 arranged on one or both sides of the anode current collectors 46.

Figure 2:
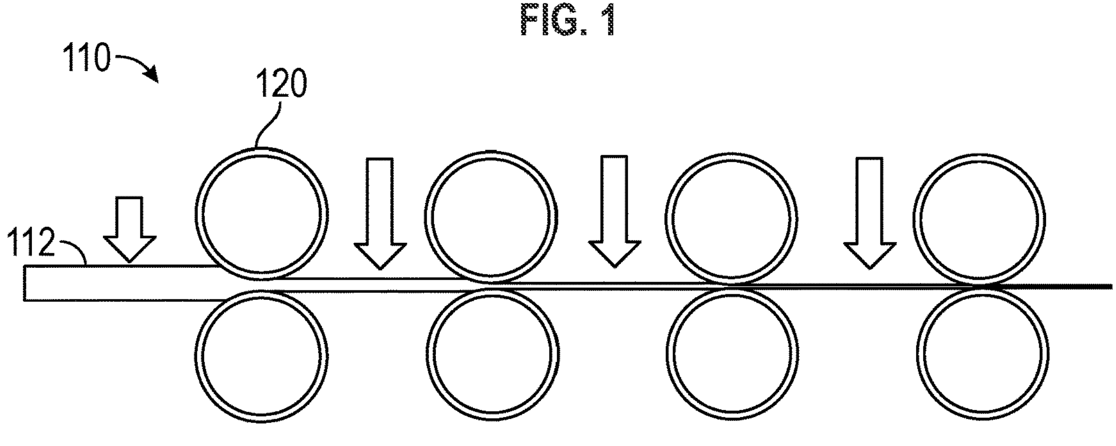
FIG. 2 illustrates an exemplary rolling system in accordance with the present disclosure for rolling a metal into a metallic foil.

With reference to FIG. 2, the anode active layers 42 may include a metal 112 rolled into a foil by a rolling system 110 of the present disclosure. The rolling system 110 includes a plurality of work rollers 120 arranged along a work line. The work rollers 120 are generally arranged in pairs spaced apart along the work line. The work rollers 120 of each pair are spaced apart to receive the metal 112 therebetween, and configured to press against the metal 112 to roll the metal 112 into a foil as the metal 112 is fed along the work line between the rollers 120 or each roller pair. The work rollers 120 may be made of any suitable material including, but are not limited to, steel, aluminum, copper, etc. The work rollers 120 may be formed in any suitable manner. For example, the work rollers 120 may be forged, cast, formed by additive manufacturing, etc. The additive manufacturing may be metal additive manufacturing followed by machining.

Figures 3A, 3B, 3C, 3D, 3E, 3F:
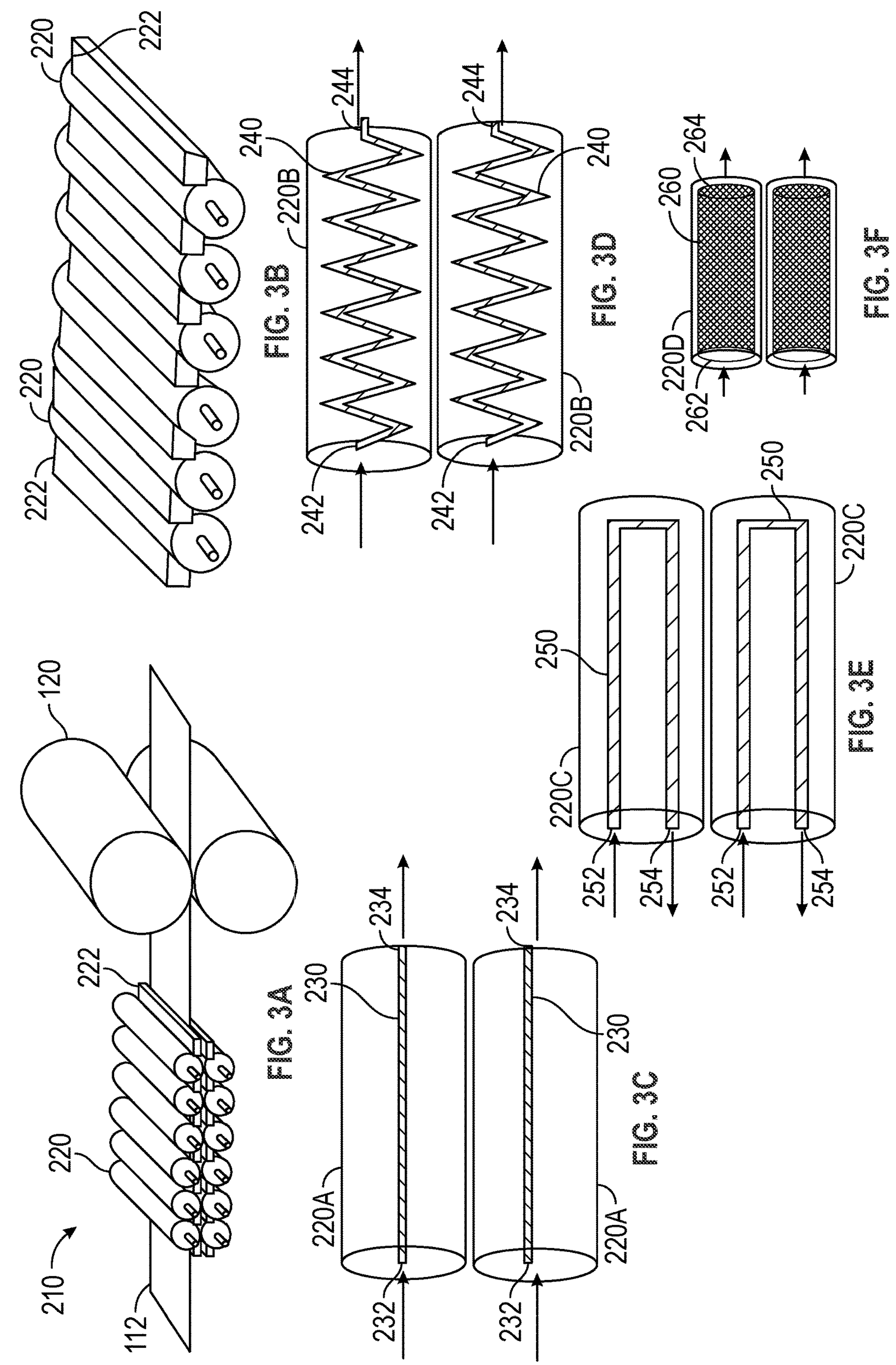
FIG. 3A is a perspective view of an exemplary cooling subsystem in accordance with the present disclosure for cooling the metal.
FIG. 3B is a perspective view of exemplary cooling rollers of the cooling subsystem of FIG. 3A.
FIG. 3C illustrates additional exemplary cooling rollers in accordance with the present disclosure.
FIG. 3D illustrates alternative cooling rollers in accordance with the present disclosure.
FIG. 3E illustrates further cooling rollers in accordance with the present disclosure.
FIG. 3F illustrates additional cooling rollers in accordance with the present disclosure.

FIG. 3A illustrates an exemplary cooling subsystem 210 in accordance with the present disclosure configured to cool the metal 112. The cooling subsystem 210 may be arranged at any suitable location along the work line of the rolling system 110 such that the cooling subsystem is in line with the work rollers 120. For example, the cooling subsystem 210 may be arranged upstream of all of the work rollers 120 and/or between one or more pairs of the work rollers 120. Multiple cooling subsystems 210 may be included so that a cooling subsystem 210 may be arranged between multiple different pairs of the work rollers 120. For example, and as illustrated in FIG. 2, the cooling subsystem 210 may be arranged at one or more of the downward facing arrows of FIG. 2, as can any of the other cooling subsystems 310, 410, 510, 610, 710 described herein.

The cooling subsystem 210 includes a plurality of cooling rollers 220, which are arranged both above and below the metal 112. The cooling rollers 220 are spaced apart enough to not reduce the thickness of the metal 112 as the metal 112 passes across the cooling rollers 220 between upper and lower sets of the cooling rollers 220. The cooling rollers 220 are configured to guide and transport the metal 112 along the work line to the work rollers 120. With additional reference to FIG. 3B, between adjacent ones of the cooling rollers 220 are support members 222. The support members 222 may be made of any material suitable to support movement of the metal 112 across the cooling rollers 220, such as any suitable polymeric material. The support members 222 may be configured to generally provide a guide and table for the metal 112 to pass across.

The cooling rollers 220 are cooled by any suitable coolant circulated through cooling channels defined within the cooling rollers 220. Cooling the cooling rollers 220 cools the metal 112 in contact with the cooling rollers 220, which strengthens the metal 112 and allows the metal 112 to be rolled to relatively stronger and thinner foil gauges. Examples of coolant that may be used to cool the cooling rollers 220 includes, but is not limited to, the following: silicone oil; liquid $N_2$; liquid Ar; and liquid $CO_2$.

Figure 9:
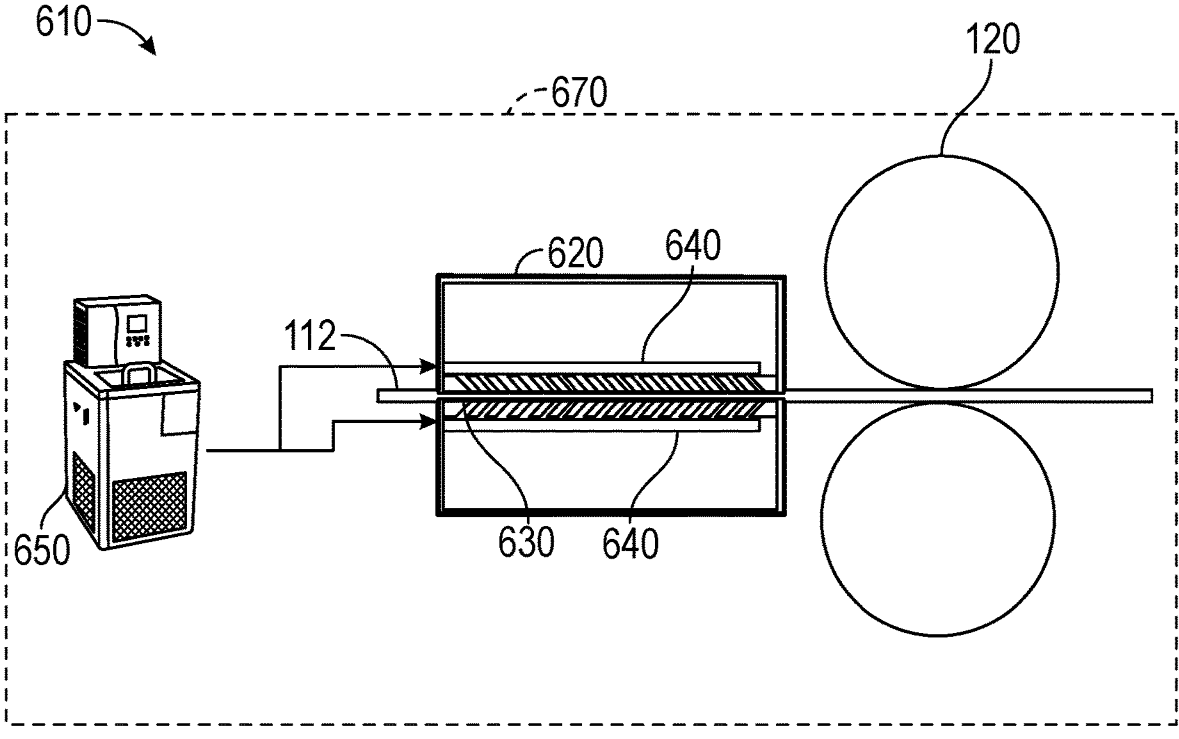
FIG. 9 illustrates another cooling subsystem in accordance with the present disclosure.
Figure 10:
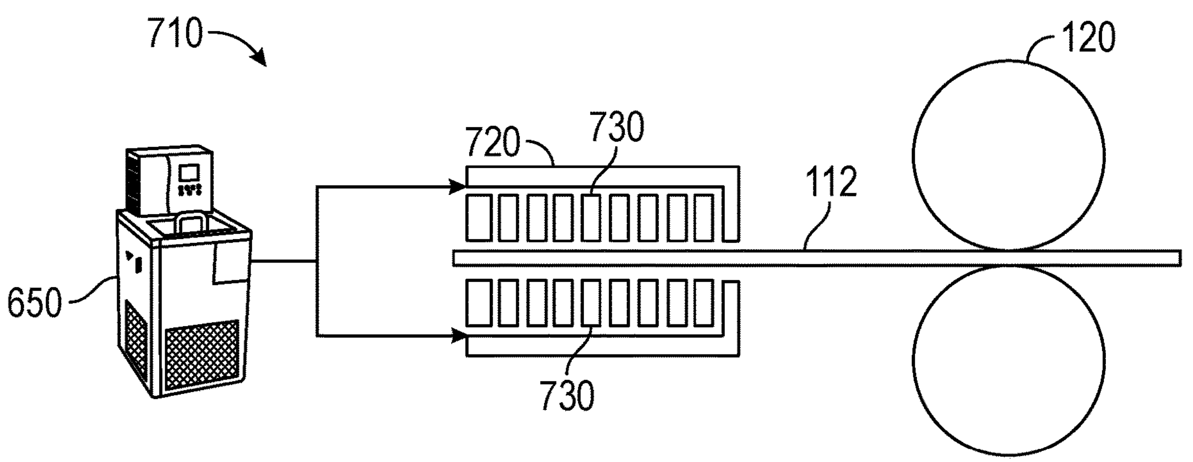
FIG. 10 illustrates an additional cooling subsystem in accordance with the present disclosure.

The coolant may be cooled in any suitable manner, such as with any suitable chiller 650 (as illustrated in FIGS. 9 and 10, for example). The chiller 650 may be any suitable chiller or other cooling device configured to cool a coolant to any suitable temperature, such as at least lower than an ambient or room temperature. The temperature may depend on the particular metal 112 being rolled by the rolling system 110. For example, the temperature may be at or below the temperature at which the metal is subject to tearing or fracturing during rolling by the rollers 120. More specifically, the chiller 212 may be configured to circulate coolant in a range of 25° C. to −70° C. Liquid Ar or liquid $N_2$ are examples of coolants that may be used to achieve temperatures below −70° C. The metal being rolled may be at any suitable temperature. For example, the temperature of the metal being rolled may be from −80° C. to 25° C., such as −40° C. or about −40° C.

The cooling rollers 220 may be configured in various different ways to be in fluid cooperation with the chiller 650 and be cooled by the coolant. For example, and with reference to FIG. 3C, the cooling subsystem 210 may include cooling rollers 220A defining channels 230. The channels 230 are configured to receive chilled coolant from the chiller 650. The channels 230 are formed in any suitable manner, such as by being drilled into forged or cast solid cooling rollers 220A. The channels 230 extend entirely through the cooling rollers 220A along, or parallel to, an axis of rotation of the rollers 220A. Each one of the channels 230 includes an inlet 232 and an outlet 234 on opposite ends of the cooling rollers 220A.

FIG. 3D illustrates additional exemplary cooling rollers 220B in accordance with the present disclosure for use with the cooling subsystem 210. The cooling rollers 220B define channels 240, which in the example illustrated extend entirely through the cooling rollers 220B from inlets 242 to outlets 244 on opposite sides of the cooling rollers 220B. The channels 240 are defined within the rollers 220B during additive manufacturing of the rollers 220B. The channels 240 extend non-linearly through the cooling rollers 220B in generally a zig-zag fashion. The channels 240 are configured to receive chilled coolant from the chiller 650.

With reference to FIG. 3E, the cooling subsystem 210 may alternatively include cooling rollers 220C. The cooling rollers 220C are cast around tubes 250, which may be made of copper or any other suitable material. The tubes 250 define channels for the coolant. The tubes 250 each include an inlet 252 and an outlet 254 on a same side of the rollers 220C. The tubes 250 may alternatively extend completely through the rollers 220C.

With reference to FIG. 3F, the cooling subsystem 210 may alternatively include cooling rollers 220D. The cooling rollers 220D define channels 260, which are generally porous areas of the rollers 220D each having an inlet 262 and an outlet 264 on opposite sides of the channels 260. The channels 260 are defined within the rollers 220D during additive manufacturing of the rollers 220D. The channels 260 are configured to receive the coolant.

FIGS. 4A-4D illustrate an additional cooling subsystem 310 in accordance with the present disclosure for cooling the metal 112. The cooling subsystem 310 is configured to direct coolant onto an exterior surface of the rollers 220. The cooling subsystem 310 includes housings 320 on opposite sides of the metal 112. The housings 320 include an upper housing and a lower housing. The housings 320 define receptacles 322, which are configured to receive coolant, such as coolant chilled by the chiller 650. The housings 320 are configured to support the cooling rollers 220 in any suitable manner that will allow the cooling rollers 220 to rotate and be exposed to coolant 324 within the receptacles 322 to cool the cooling rollers 220 and the metal 112 in contact with the cooling rollers, as illustrated in FIG. 4C, for example. With reference to FIG. 4D, gaps 326 are defined between the housing 320 and the cooling rollers 220 to allow the cooling rollers 220 to rotate and permit the coolant 324 to flow out from within the receptacle 322 and onto the cooling rollers 220. The gap 326 may be any suitable size. For example, the gap 326 may provide a rotational clearance of 0.1 mm-0.5 mm.

The coolant 324 may be any suitable liquid coolant, such as silicone oil or liquid argon, for example. The coolant 324 is in contact with the outer surface of the cooling rollers 220 to cool the cooling rollers 220. The gaps 326 between the housing 320 and the cooling rollers 220 allow the coolant 324 to seep down onto the cooling rollers 220 to lubricate the cooling rollers 220. When the coolant 324 is liquid argon, liquid argon fumes will leak from the gap 326 onto the cooling rollers 220 to provide an inert blanket to avoid moisture contamination on the cooling rollers 220. Silicone oil and other inert cooling fluids also avoid side-reactions and any possible contamination of lithium.

FIGS. 5A and 5B illustrate an additional cooling subsystem 410 in accordance with the present disclosure. The cooling subsystem 410 includes an upper guide 420 and a lower guide 430, which is opposite to the upper guide 420. The upper guide 420 and the lower guide 430 are spaced apart to accommodate the metal 112 therebetween. The upper guide 420 defines perforations 422 configured to direct chilled air to the metal 112 from any suitable chilled air source. For example, the chiller 650 may be configured to chill the air. The upper guide 420 may be made of any suitable material, including any suitable metallic material, such as stainless steel. The upper guide 420 may be spaced apart from the metal 112 so as to not contact the metal 112. The chilled air directed through the perforations 422 generates an air blanket 424, which pushes the metal 112 against the lower guide 430.

The lower guide 430 is generally a hollow enclosure made of any suitable thermally conductive material, such as copper or any other suitable thermally conductive alloy. The lower guide 430 serves as a load guide for the metal 112, and may include any suitable coating to minimize friction between the metal 112 and the lower guide 430, such as Teflon. Any suitable coolant is circulated through the lower guide 430 to cool the lower guide 430 and the metal 112 pressed against it. The coolant may be silicone oil, for example. As the metal 112 moves between the upper guide 420 and the lower guide 430, the metal 112 is cooled by both the air blanket 424 and the lower guide 430. The lower guide 430 may include an inlet 432 and an outlet 434 to circulate the coolant through the lower guide 430 from any suitable source, such as the chiller 650. To facilitate movement of the metal 112 across the lower guide 430, the lower guide 430 may include rounded edges on a downstream end of the lower guide 430 and an upstream end of the lower guide 430. The lower guide 430 may also include any suitable coating, such as Teflon, to minimize friction between the metal 112 and the lower guide 430.

Figure 6:
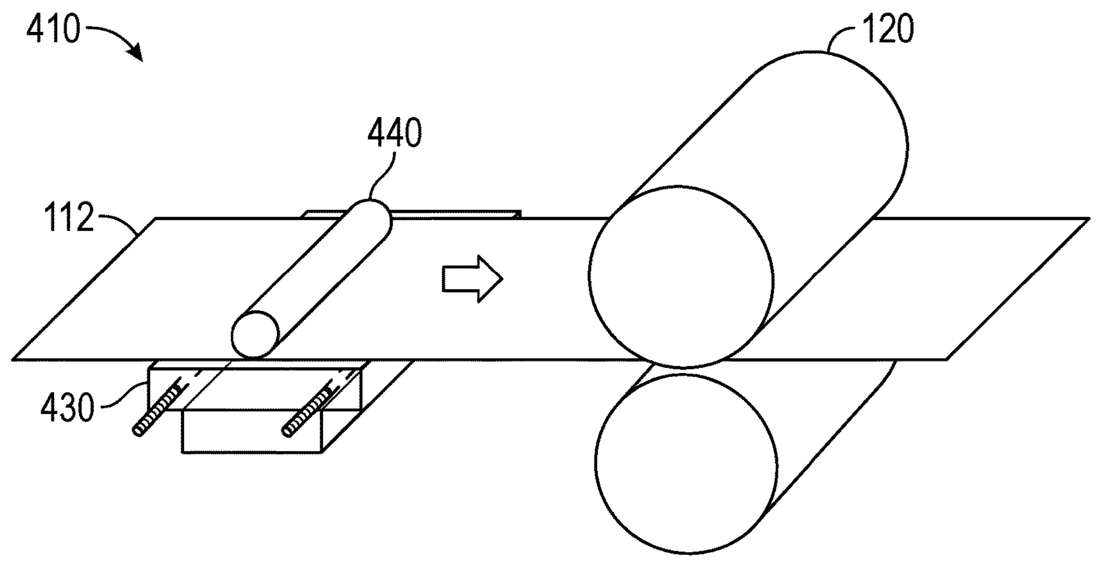
FIG. 6 is a perspective view of another cooling subsystem in accordance with the present disclosure.

With reference to FIG. 6, the upper guide 430 may be configured as a guide roll 440. The guide roll 440 is configured to press the metal 112 against the lower guide 430 to facilitate cooling of the metal 112 by the lower guide 430. The guide roll 440 may be made from any suitable insulating material. Although only one guide roll 440 is illustrated, the cooling subsystem 410 may include any suitable number of guide rolls 440.

Figure 7:
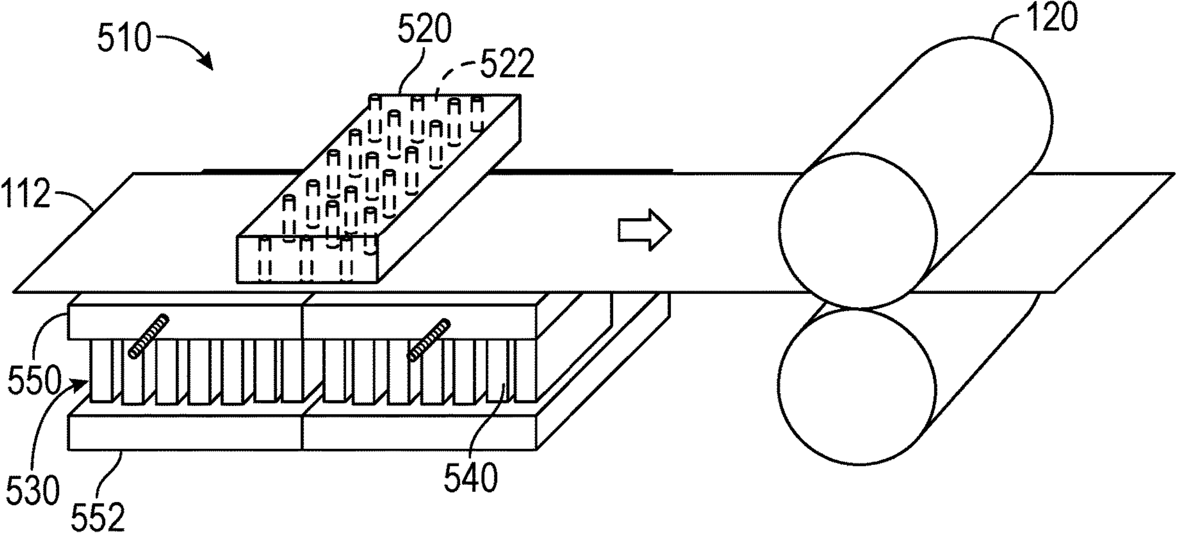
FIG. 7 is a perspective view of an additional cooling subsystem in accordance with the present disclosure.

FIG. 7 illustrates an additional cooling subsystem 510 in accordance with the present disclosure for inclusion with the rolling system 110 to cool the metal 112. The cooling subsystem 510 includes an upper cooling guide 520 and a lower cooling guide 530. The upper cooling guide 520 is the same as, or substantially similar to, the upper cooling guide 420. The upper cooling guide 520 defines perforations 522 configured to direct chilled air to the metal 112 to cool the metal 112 and generate an air blanket that presses the metal 112 into contact with the lower cooling guide 530.

The lower cooling guide 530 is configured as a Peltier stage, which is configured to be cooled to sub ambient temperatures and configured as a load guide to support the metal 112. The lower cooling guide 530 is generally a solid-state heat pump that operates on the Peltier effect. The lower cooling guide 530 includes an array 540 of p- and n-type semiconductor elements that are doped with electrical carriers. The semiconductor elements are arranged into the array 540, which is electrically connected in series, and thermally connected in parallel. This array 540 is then affixed to an upper ceramic substrate 550 and a lower ceramic substrate 552, which are on opposite sides of the array 540 of the semiconductor elements. In general, heat is absorbed by the upper ceramic substrate 550 and transferred to the lower ceramic substrate 552, which acts as a heat sink. Between the upper ceramic substrate 550 and the array 540 are copper conductors. Copper conductors are also included between the lower ceramic substrate 552 and the array 540.

The p-type semiconductors of the array 540 are doped with certain atoms that have fewer electrons than necessary to complete the atomic bonds within the crystal lattice. When a voltage is applied, there is a tendency for conduction electrons to complete the atomic bonds. When conduction electrons do this, they leave "holes," which essentially are atoms within the crystal lattice that now have local positive charges. Electrons are then continually dropping in and being bumped out of the holes and moving on to the next available hole. In effect, it is the holes that are acting as the electrical carriers. Electrons move relatively more freely in the copper conductors as compared to the semiconductors. When electrons leave the p-type and enter into the copper on the cold side at the upper ceramic substrate 550, holes are created in the p-type as the electrons jump out to a higher energy level to match the energy level of the electrons already moving in the copper. The extra energy to create these holes comes by absorbing heat. Meanwhile, the newly created holes travel downwards to the copper on the hot side at the lower ceramic substrate 552. Electrons from the hot side copper move into the p-type and drop into the holes, releasing the excess energy in the form of heat.

The n-type semiconductors of the array 540 are doped with atoms that provide more electrons than necessary to complete the atomic bonds within the crystal lattice. When a voltage is applied, the extra electrons are easily moved into the conduction band. However, additional energy is required to get the n-type electrons to match the energy level of the incoming electrons from the cold-side copper. The extra energy comes by absorbing heat. Finally, when the electrons leave the hot-side of the n-type semiconductors, they once again can move freely in the copper, drop down to a lower energy level, and release heat in the process. Thus, with the lower cooling guide 530 heat is absorbed at the cold side (upper ceramic substrate 550) of the n- and p-type elements, and heat is released at the hot side (lower ceramic substrate 552) of thermoelectric element to cool the metal 112.

Figure 8:
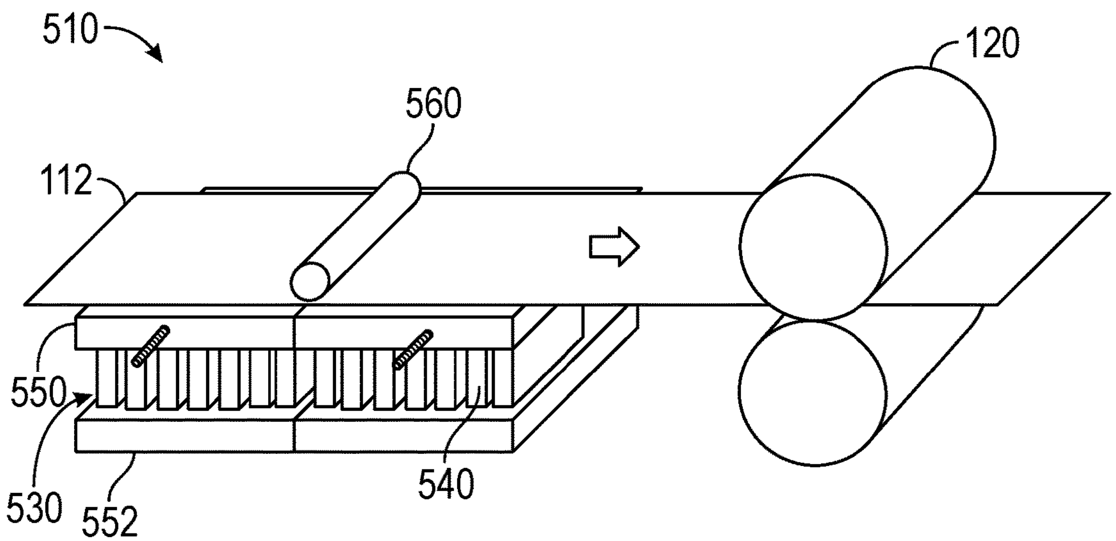
FIG. 8 is a perspective view of a further cooling subsystem in accordance with the present disclosure.

With reference to FIG. 8, the upper cooling guide 520 may be configured as a guide roll 560. The guide roll 560 is configured to press the metal 112 against the lower cooling guide 530 to facilitate cooling of the metal 112 by the lower cooling guide 530. The guide roll 560 may be made from any suitable insulating material. Although only one guide roll 560 is illustrated, the cooling subsystem 510 may include any suitable number of guide rolls 560.

FIG. 9 illustrates an additional cooling subsystem 610 in accordance with the present disclosure for inclusion with the rolling system 110 to cool the metal 112. The cooling subsystem 610 includes a load guide 620 defining a primary channel 630 for the metal 112, and a plurality of coolant channels 640 on opposite sides of the primary channel 630. The coolant channels 640 are in fluid cooperation with the chiller 650 to receive chilled coolant from the chiller 650. The coolant channels 640 are configured to direct coolant to the primary channel 630 to deposit the coolant on opposite sides of the metal 112. The coolant may be any suitable coolant, such as silicone oil. The silicone oil chills the metal 112 and creates a lubricating film for moving the metal 112 through the load guide 620. The coolant thus also acts as a lubricant to allow the metal 112 to move through the primary channel 630 without sticking to the load guide 620, thereby enabling a continuous process. The load guide 620 may be made of any suitable material, such as any suitable polymeric material. The load guide 620 may be formed in any suitable manner, such as by any suitable 3D printing process. The metal 112 may be drawn through the load guide 620 in any suitable manner, such as within a vacuum. Thus, the cooling subsystem 610 may be sealed within any suitable air-tight chamber 660. The vacuum also pulls off any residual moisture to keep the metal 112 inert.

FIG. 10 illustrates a cooling subsystem 710 in accordance with the present disclosure configured to cool the metal 112 with a coolant in the form of chilled inert gas. The gas may be chilled in any suitable manner, such as by the chiller 650. The cooling subsystem 710 includes a load guide 720 defining a plurality of machined channels 730 configured to direct chilled inert gas to the metal 112 to cool the metal 112. The gas is applied under pressure to suspend the metal 112 within the load guide 720.

Figure 11:
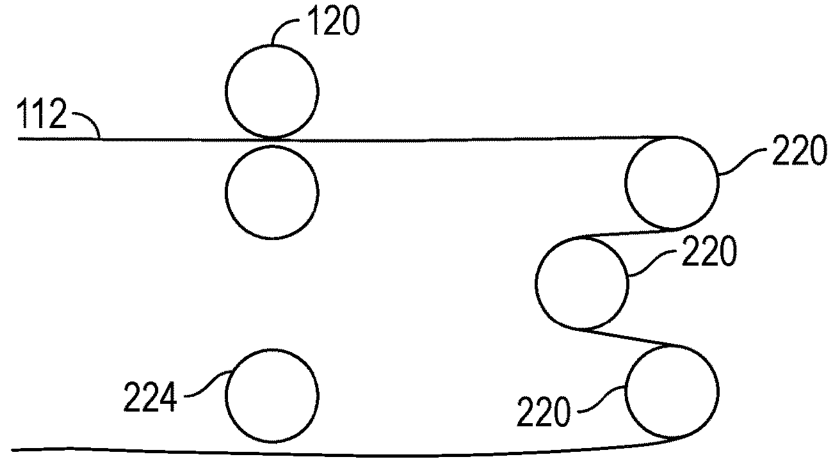
FIG. 11 is a side view of another exemplary rolling system in accordance with the present disclosure including a cooling subsystem with offset cooling rollers.

FIG. 11 illustrates an exemplary cooling roller arrangement for any suitable cooling rollers 220, such as the cooling rollers 220A, 220B, 220C, etc. The metal 112 may be directed to the cooling rollers 220 by a guide roller 224. The cooling rollers 220 are staggered or offset from each other, which results in a greater surface area of the metal 112 contacting the cooling rollers 220 and being cooled by the cooling rollers 220. Thus, staggering the cooling rollers 220 generally increases the cooling efficiency of the cooling rollers 220. The cooling rollers 220 may be staggered vertically as illustrated, or horizontally. The cooling rollers 220 are staggered with respect to the rotational axes thereof.

In the drawings, the systems of the present disclosure are generally illustrated as horizontal systems oriented to move left to right. However, the systems may be oriented in any suitable alternate orientation. For example, the orientation of the entire rolling mill setup (including the cooling rollers) may be changed from horizontal to vertical to take advantage of gravity and minimize the tensile (pulling) force induced on the thin Li foils during rolling. This may reduce the potential of a foil tear during manufacturing.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A system configured to roll a metal into a foil, the system comprising:

work rollers spaced apart to accommodate the metal therebetween, the work rollers configured to press against the metal to roll the metal into the foil; and a cooling subsystem spaced apart from the work rollers on a work line configured to feed the metal to the work rollers, the cooling subsystem configured to cool the metal as the metal moves along the work line;

wherein:

the cooling subsystem includes an upper guide and a lower guide opposite to the upper guide, the upper guide and the lower guide are spaced apart to accommodate the metal therebetween; and one of the upper guide and the lower guide is configured to push the metal against the other of the upper guide and the lower guide.

2. The system of claim 1, wherein the metal includes at least one of lithium, indium, tin, lead, and sodium.

3. The system of claim 1, wherein the foil is configured as an active layer of a battery electrode.

4. The system of claim 1, wherein the cooling subsystem includes cooling rollers defining channels therein configured to receive coolant to cool the cooling rollers and cool the foil in contact with the cooling rollers.

5. The system of claim 4, wherein the channels extend entirely through the cooling rollers parallel to an axis of rotation of the cooling rollers.

6. The system of claim 4, wherein the channels extend non-linearly relative to an axis of rotation of the rollers.

7. The system of claim 4, wherein the channels include an inlet and an outlet at a common side of the cooling rollers.

8. The system of claim 4, further comprising polymeric support members between the cooling rollers.

9. The system of claim 4, wherein the cooling subsystem includes a housing adjacent to the cooling rollers, the housing defining a receptacle configured such that outer surfaces of the cooling rollers are accessible from within the housing and coolant present within the receptacle contacts the outer surfaces of the rollers, and wherein gaps are defined between the housing and each one of the cooling rollers providing a rotational clearance for the cooling rollers and providing controlled release of the coolant from the receptacle onto the cooling rollers to cool and lubricate the cooling rollers.

10. The system of claim 4, wherein adjacent rollers of the cooling rollers are offset from one another.

11. The system of claim 1, wherein:

the upper guide defines perforations configured to direct chilled air through the upper guide to the metal to cool the metal with an air blanket; and the lower guide is made of a thermally-conductive material and defines a cooling channel configured to circulate coolant through the lower guide to cool the metal, the air blanket pushes the metal against the lower guide.

12. The system of claim 1, wherein:

the upper guide includes a guide roller made of an insulating material, the guide roller is configured to press the metal against the lower guide; and the lower guide is made of a thermally-conductive material and defines a cooling channel configured to circulate coolant through the lower guide to cool the metal, the guide roller is configured to push the metal against the lower guide.

13. The system of claim 1, wherein:

the upper guide defines perforations configured to direct chilled air through the upper guide to the metal to cool the metal with an air blanket; and the lower guide includes a heat pump configured to cool the metal, the air blanket pushes the metal against the lower guide.

14. The system of claim 1, wherein:

the upper guide includes a guide roller made of an insulating material, the guide roller is configured to press the metal against the lower guide; and the lower guide includes a Peltier stage configured to cool the metal, the guide roller is configured to push the metal against the lower guide.

15. The system of claim 1, wherein:

the cooling subsystem includes a load guide defining a primary channel therethrough with the work line extending through the primary channel, a plurality of upper channels are above the primary channel, and a plurality of lower channels are below the primary channel; and the upper channels and the lower channels are configured to direct a coolant to the metal.

16. A system configured to roll a metal into a foil, the system comprising:

work rollers spaced apart to accommodate the metal therebetween, the work rollers configured to press against the metal to roll the metal into the foil; and a cooling subsystem spaced apart from the work rollers on a work line configured to feed the metal to the work rollers, the cooling subsystem including an upper guide and a lower guide on opposite sides of the work line, at least one of the upper guide and the lower guide is configured to be cooled with a coolant to cool the metal as the metal moves through the cooling subsystem;

wherein at least one of the upper guide and the lower guide includes cooling rollers defining cooling channels configured for circulating the coolant through the cooling rollers.

17. The system of claim 16, wherein one of the upper guide and the lower guide is configured to push the metal against the other of the upper guide and the lower guide.

18. A system configured to roll a metal into a foil, the system comprising:

work rollers spaced apart to accommodate the metal therebetween, the work rollers configured to press against the metal to roll the metal into the foil; and a cooling subsystem spaced apart from the work rollers on a work line configured to feed the metal to the work rollers, the cooling subsystem including an upper guide and a lower guide on opposite sides of the work line, at least one of the upper guide and the lower guide is configured to cool the metal as the metal moves through the cooling subsystem;

wherein the metal includes at least one of lithium, indium, tin, lead, and sodium, and the foil is configured as an active layer of a battery electrode; and wherein at least one of the upper guide and the lower guide includes a heat pump configured to cool the metal.

* * * * *